(12) United States Patent
Yan et al.

(10) Patent No.: US 7,509,418 B2
(45) Date of Patent: Mar. 24, 2009

(54) AUTOMATIC MANAGEMENT OF E-SERVICES

(75) Inventors: Yong Yan, Fremont, CA (US); Zhichen Xu, Sunnyvale, CA (US); Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1067 days.

(21) Appl. No.: 10/179,642

(22) Filed: Jun. 25, 2002

(65) Prior Publication Data

US 2003/0236882 A1    Dec. 25, 2003

(51) Int. Cl.
*G06F 15/173* (2006.01)

(52) U.S. Cl. .................. 709/225; 709/220; 709/221; 709/223; 709/224; 709/228; 718/105

(58) Field of Classification Search .......... 709/221–227
See application file for complete search history.

(56) References Cited

U.S. PATENT DOCUMENTS

| | | | |
|---|---|---|---|
| 6,466,984 B1 * | 10/2002 | Naveh et al. ................ 709/228 |
| 6,584,502 B1 * | 6/2003 | Natarajan et al. ........... 709/224 |
| 6,728,748 B1 * | 4/2004 | Mangipudi et al. .......... 718/105 |
| 2003/0149570 A1 * | 8/2003 | Qiu ................................. 705/1 |

OTHER PUBLICATIONS

Mainwaring and Culler; "Design Challenges of Virtual Networks: Fast, General-Purpose Commuinication".

Foster, Kesselman, and Tuecke; "The Anatomy of the Grid Enabling Scalable Virtual Organizations".

* cited by examiner

*Primary Examiner*—Yves Dalencourt

(57) ABSTRACT

A system for automatic management of an e-service which partitions an e-service life-cycle among operational functionalities and non-operational functionalities and tends to the operational functionalities, thereby reducing the development burden of an e-service and enabling e-service owners to stay more focused on business related issues. In addition, a system according to the present teachings facilitates the smooth transition among the phases of an e-service life-cycle and facilitates the partition of system functionality into physically distributed components.

22 Claims, 7 Drawing Sheets

AUTOMATIC MANAGEMENT OF E-SERVICES

BACKGROUND OF THE INVENTION

1. Field of Invention

The present invention pertains to the field of e-services. More particularly, this invention relates to automatic management of e-services.

2. Art Background

An e-service may be defined as a system that provides electronic services to one or more clients through the a network such as the Internet. Examples of e-services include information systems and e-business systems.

A typical e-service employs a set of resources. Examples of resources include software resources such as files, data bases, application programs and services including information services, etc. Other examples of resources include hardware resources such as storage devices, printers, communication devices, computers, etc.

The development and operation of a typical e-service includes a set of relatively complex tasks. These tasks usually include a specification of system requirements for the e-service, the acquisition and configuration of the resources that support the e-service, and service level monitoring. These tasks typically impose a burden on a provider of an e-service which may distract from other important issues pertaining to an e-service.

SUMMARY OF THE INVENTION

A system is disclosed for automatic management of an e-service. The system partitions an e-service life-cycle among operational functionalities and non-operational functionalities and tends to the operational functionalities, thereby reducing the development burden of an e-service and enabling e-service owners to stay more focused on business related issues. In addition, the system facilitates the smooth transition among the phases of an e-service life-cycle and facilitates the partition of system functionality into physically distributed components.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
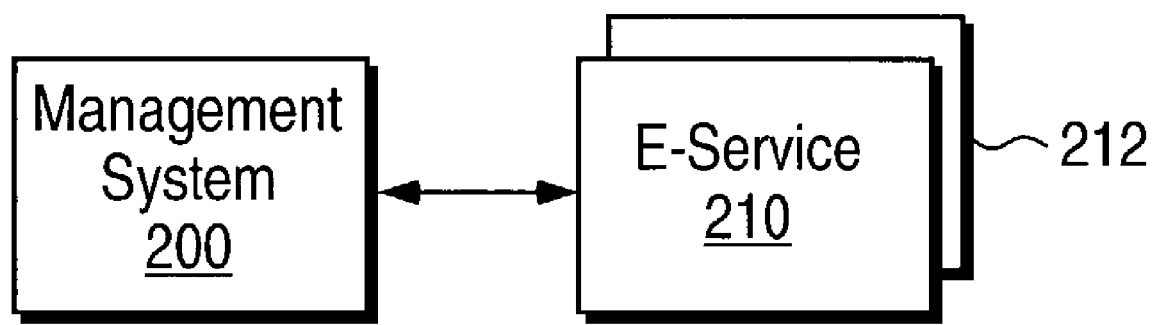
FIG. 1 shows a management system according to the present techniques.

FIG. 1 shows a management system 200 according to the present techniques. The management system 200 provides automatic management for a set of e-services 210-212. Each of the e-services 210-212 in one embodiment is a system that provides electronic services to one or more clients through the Internet.

The management system 200 provides a platform for supporting a wide variety of e-services. The management system 200 provides functionalities for managing the development and operation of the e-services 210-212 and functionalities for managing the interactions among the e-services 210-212.

Table 1 shows the functionality partitioning between the management system 200 and each e-service 210-212 that it manages. The second column shows the functionalities for managing the development and operation of the e-services 210-212 at different stages of their life-cycles.

TABLE 1

| Life-Cycle | Management Functionalities | E-service Managed |
|---|---|---|
| Logic Design | Management of common service and application repositories Management of design tools, frameworks, simulation tools, and design schemes; logic design verification Management of logic design | Conduct logic design using automated tools, frameworks, and schemes Derive system requirements from the e-service specification Conduct simulation and verification |
| Deployment | Acquire and configure required resources Configure services Configure policy enforcement mechanisms | N/A |
| Runtime System | Ensure system requirements for both service quality and runtime system Conduct continuous monitoring Collect accounting data for billing Generate performance reports and system requirement violation reports | N/A |
| Maintenance | Conduct cost and performance analysis, violation analysis, and demand and supply prediction to generate deployment optimizations | Conduct violation analysis to generate design optimizations to the logic design phase |

Figure 2:
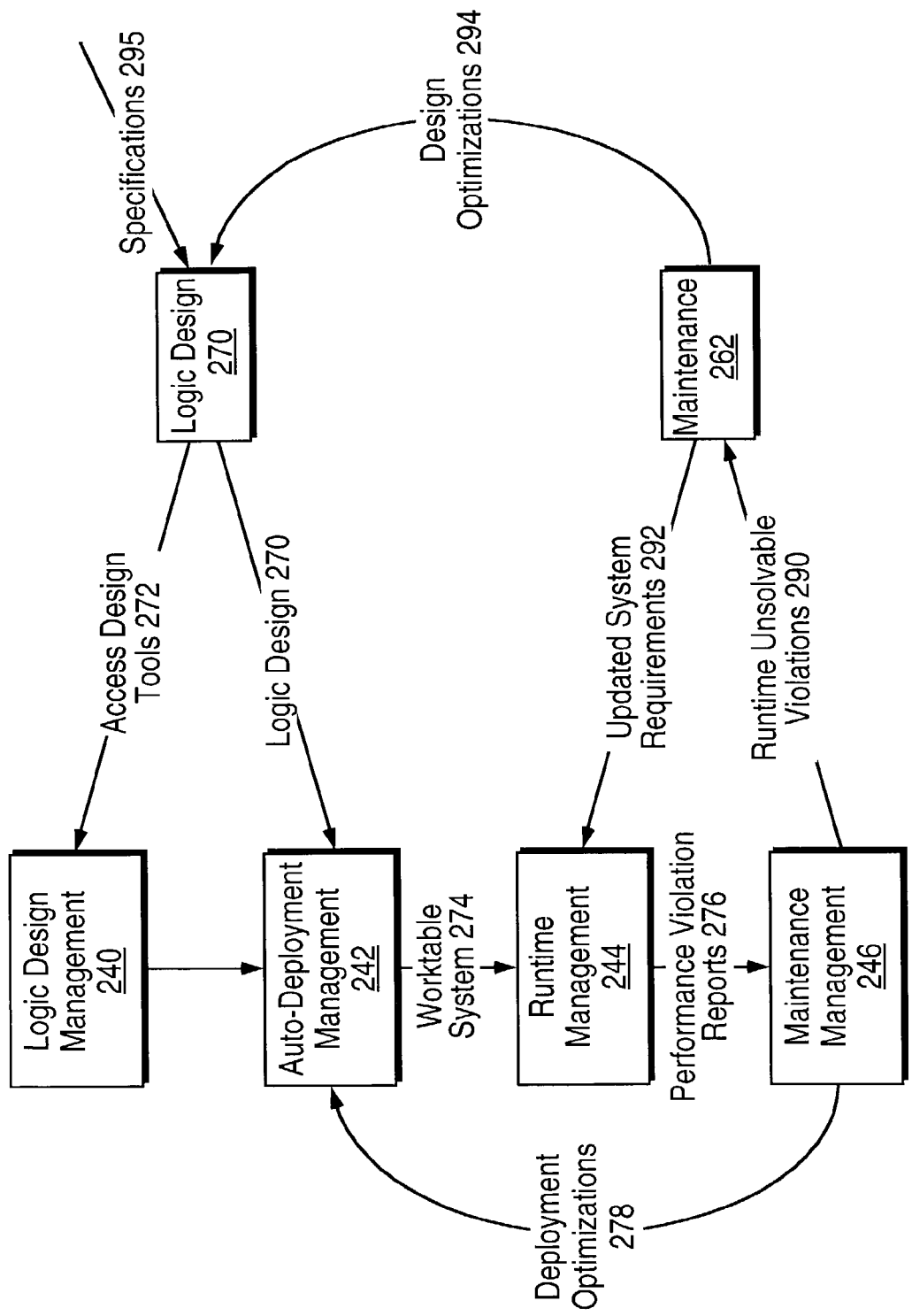
FIG. 2 illustrates interactions between the management system and an e-service during a life-cycle of the e-service.

FIG. 2 illustrates the interaction between the management system 200 and the e-service 210 during a life-cycle of the e-service 210. The life-cycle of the e-service 210 is represented as a logic design phase 260 and a maintenance phase 262. The management system 200 in this representation includes a logic design management component 240, an auto-deployment management component 242, a runtime management component 244, and a maintenance management component 246.

During the logic design phase 260, a client of the management system 200 conducts a logic design for the e-service 210 in response to a specification 295 for the e-service 210. The logic design management component 240 provides a set of design tools 272 that are accessed during the logic design phase 260. The logic design phase 260 yields a logic design 270 for the e-service 210.

The auto-deployment management component 242 generates a workable system 274 by configuring a set of resources and services in response to the logic design 270. The workable system 274 drives the runtime management component 244.

The runtime management component 244 enforces the requirements of the e-service 210. The runtime management component 244 reports performance data and violations 276 to the maintenance management component 246 to generate deployment optimizations 278. Violations 290 that are not resolvable by the maintenance management component 246 may be reported to the maintenance phase 262.

The maintenance phase 262 analyzes any runtime violations 290 and attempts to resolve the violations either by generating updated system requirements 292 or by communicating design optimizations 294 to the logic design phase 260 to redesign the e-service 210.

Figure 3:
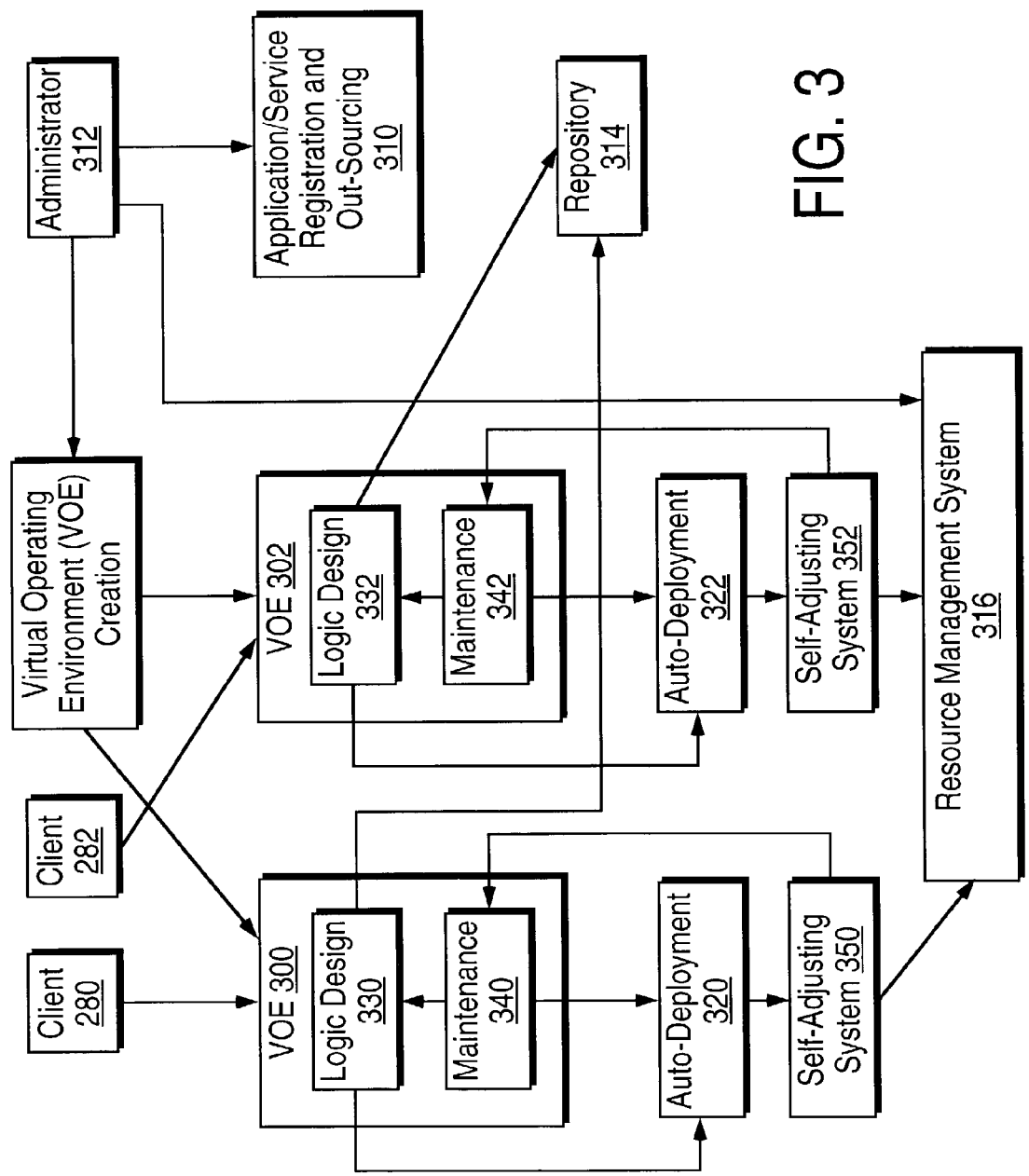
FIG. 3 illustrates elements of the management system that manage the interactions among a set of e-services.

FIG. 3 illustrates the elements of the management system 200 which manage the interactions among the e-services 210-212. These elements provide mechanisms for representing, protecting, and managing each e-service 210-212 and mechanisms for prioritizing the e-services 210-212 to resolve resource allocation race conditions.

A set of clients 280-282 are shown each of which opens an account with the management system 200. The opening of the accounts causes the management system 200 to create a virtual operating environment (VOE) 300 for the client 280 and a VOE 302 for the client 282. The VOEs 300-302 encapsulate the life-cycle of the corresponding e-services 210-212. Each VOE 300-302 includes a corresponding logic design component 330-332 and a corresponding maintenance component 340-342. The VOEs 300-302 enforce privacy protection because all activities and data in a VOE are only accessible to the owner of the VOE.

The management system 200 includes an application/service registration and outsourcing component 310. The component 310 is used by an administrator 312 to register applications/services which are available for supporting the e-services 210-212. The component 310 may also be used by the administrator 312 to out-source applications/services. The management system 200 includes a repository 314 for maintaining the available applications and services.

The management system 200 in this embodiment also maintains the design tools 272 in the repository 314. The design tools 272 may be accessed to assist in the logic design of the e-services 210-212. The administrator 312 may build resource templates for types of physical resources and for accounting. In addition, billing data may be collected by physical resources and sent to a billing system.

The clients 280-282 start the development of the e-services 210-212 with a well-defined e-service specification—for example the specification 295. The clients 280-282 use the design tools 272 provided in the management system 200 including application frameworks to produce a logic design—for example the logic design 270. In addition, the clients 280-282 may verify the designs using a simulator. A logic design, for example the logic design 270, provides the appropriate information that enables the management system 200 to perform automatic deployment and runtime management for an e-service. A logic design includes a mapping between services and resources, a set of resource auto-configuration information, and a set of service auto-configuration information.

The management system 200 includes a set of auto-deployment components 320-322 which are elements of the VOEs 300-302, respectively. Each auto-deployment component 320-322 component takes as input a logic design from the corresponding logic design component 330-332 and requirement update requests from the corresponding maintenance component 340-342. In response to a logic design, each auto-deployment component 320-322 builds the corresponding e-service 210-212 by allocating the appropriate physical resources and services. The auto-deployment components 320-322 initiate an auto-configuration process by configuring the resources and then configuring the services. The auto-deployment components 320-322 receive requirement update requests from the corresponding VOE 300-302 and in response automatically conduct resource reallocation and service re-deployment to adjust behavior at runtime.

The management system 200 includes a set of self-adjusting systems 350-352 which correspond to the VOEs 300-302, respectively. The self-adjusting systems 350-352 are self-managing and self-protecting systems. The self-adjusting systems 350-352 intelligently ensure service level agreements of the corresponding e-services 210-212 including service requirements and system requirements by conducting continuous monitoring, dynamic resource reallocation, service redeployment, and policy adjustments. At runtime, the self-adjusting systems 350-352 interact with a resource management system 316 to query, acquire, and release resources. The resource management system 316 reports unresolvable violations to the VOE 300-302 of the corresponding e-service 210-212.

The resource management system 316 manages the physical resources owned by the management system 200. The resource management system 316 maintains a global view of the distributed physical resources and their connectivity. The resource management system 316 provides interfaces that enable the self-adjusting systems 350-352 to query, acquire and release resources. The resource management system 316 also provides interfaces for the administrator 312 to register and out-source resources.

Figure 4A:
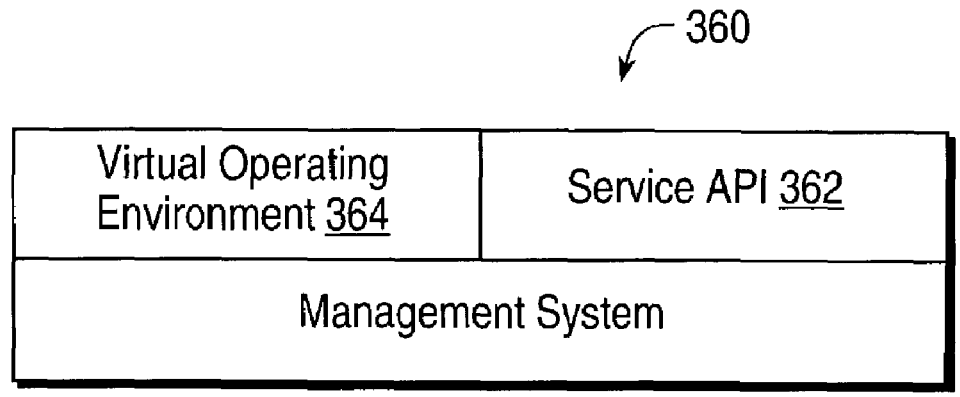
FIGS. 4a-4b illustrate a set of interfaces provided by the management system.
Figure 4B:
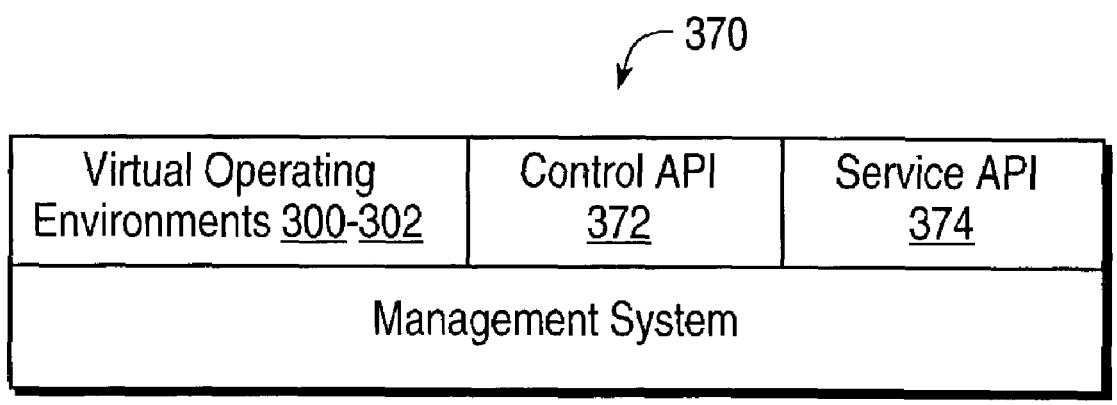

FIGS. 4a-4b illustrate a set of interfaces 360 and 370 provided by the management system 200. The management system 200 provides the interface 360 to the clients 280-282 and provides the interface 370 to the administrator 312.

The interface 360 includes a service (application program interface) API 362 for contacting the management system 200. The service API 362 may be used for applying for public services, applications, and tools. The interface 360 includes a VOE API 364 which may be employed by a user to perform logic design.

The interface 370 includes a control API 372 for controlling the management system 200. The interface 370 includes a service API 374 for managing user-related activities such as billing, account, maintenance and system queries, etc. The administrator 312 "sees" the VOEs 300-302 created for users as "black boxes" which are not accessible by the administrator 312.

The management system 200 partitions an e-service life-cycle among operational functionalities and non-operational functionalities. The management system 200 tends to the operational functionalities, thereby reducing the development burden of an e-service and enabling e-service owners to stay more focused on business related issues. The development platform for e-services set forth above enables standard e-service development tools, environments and specification languages, thereby reducing the development cost of e-services. The management system 200 reduces the complexity of e-service management and provides automatic support.

In addition, the management system 200 facilitates the smooth transition among the phases of an e-service life-cycle and facilitates the partition of system functionality into physically distributed components. The management system 200 enforces the service level agreement of an e-service through a self-adjusting system and a number of control circles that span different phase of an e-service life-cycle and provides a means to resolve the contention between protection and resource utilization. The architecture set forth above seamlessly distributes the management of scalability, security, reliability, availability, and QOS into different system components.

Figure 5:
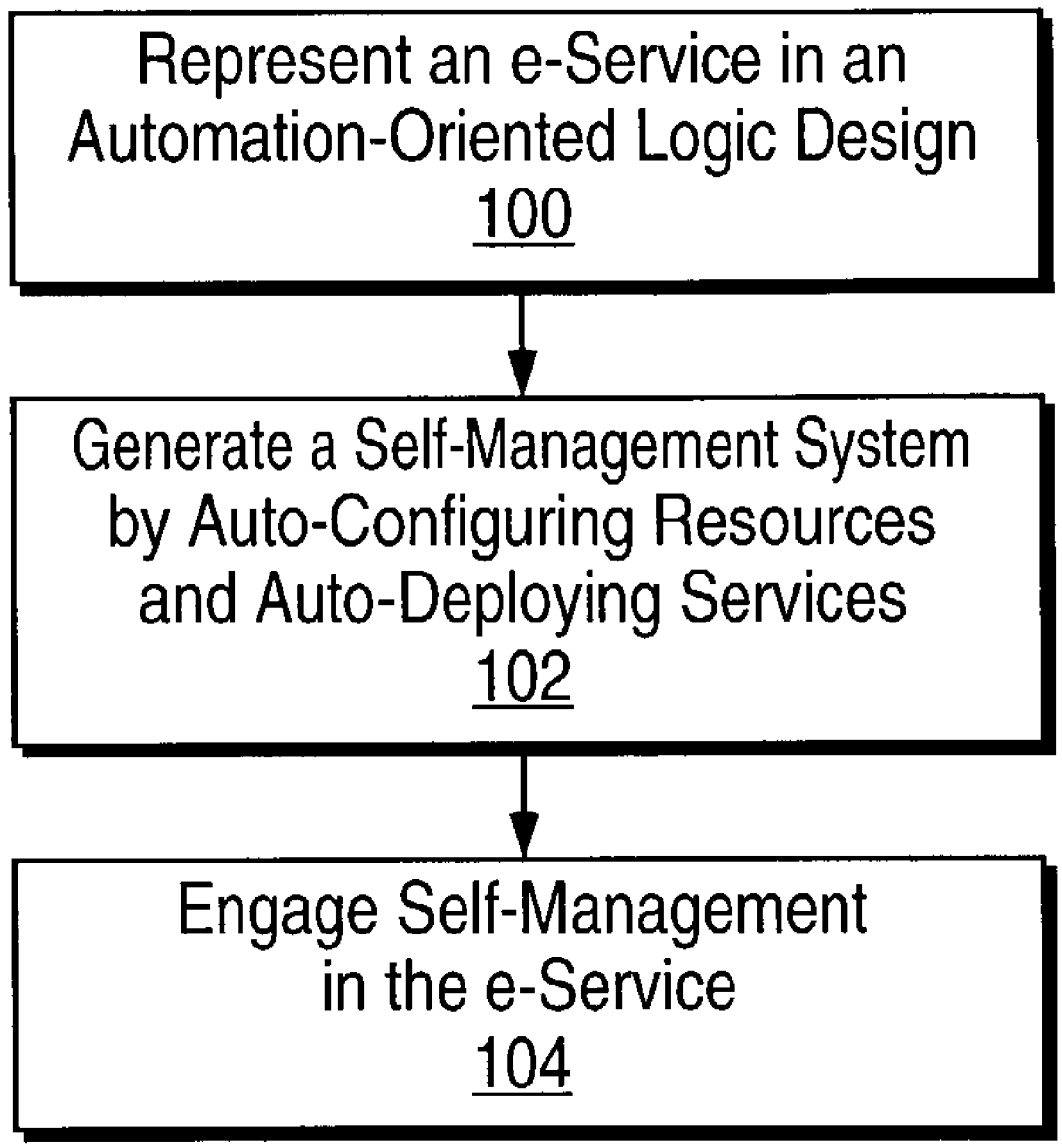
FIG. 5 is a method for generating an e-service according to the present techniques.

FIG. 5 is a method for generating an e-service according to the present techniques. This method yields an auto-deploying and self-managing system in response to a logic design for the e-service. At step 100, an e-service is represented in an automation-oriented logic design. At step 102, a self-management system for the e-service is generated by auto-configuring resources and auto-deploying services. At step 104, an e-service is self-managed.

The logic design process of an e-service at step 100 starts with a well-defined e-service specification. An e-service specification may specify service demands and service level agreements (SLAs). The service demands may specify what types of services should be provided to which types of clients. The SLAs may specify service requirements and system requirements.

A logic design is the output of a logic process and may include mapping information between services and resources, resource auto-configuration information, and service auto-configuration information which enable e-service management automation. A mapping between services and resources may be represented with a virtual resource graph. A node in the graph represents a resource demand, i.e. a virtual resource. A virtual resource specifies the type of the resource, for example computing or storage, capacity, cost, and system requirements, i.e. RAS. A virtual resource also specifies what kinds of services are to be deployed on it. For example, a virtual resource may contain descriptors of the services and applications that are to be deployed on it. Each service/application descriptor has a service requirement which specifies QOS and security requirements.

An edge between two nodes (virtual resources) is a virtual communication channel (VCC) with an aggregated communication resource requirement. A VCC consists of a set of virtual communication sessions (VCSs). A VCS connects a service on one end to a service on another end, and it also contains QOS and security requirements. The aggregated communication resource requirement of a VCC is derived from the communication QOS and security requirements of the VCSs in the VCC.

Resource auto-configuration information provides the configuration ordering among the virtual resources. This may be represented as a directed graph where the directed edges give auto-configuration ordering among virtual resources. This graph has one origin, which is the starting node of the auto-configuration process. No directed cycles are allowed.

The auto-deployment information provides the auto-deployment ordering among services. A multi-layered directed graph may be used to represent this information, where directed edges represent auto-deployment/configuration ordering among services. The services in each virtual resource are sorted into different deployment/configuration layers based on the dependencies among services. No directed cycles are allowed.

A runtime e-service is generated at step 102 by resource auto-configuration and service auto-deployment. Resource virtualization mechanisms are provided by intelligent resources (i-resources) and active resources (a-resources).

First, an i-resource is created for each virtual resource and each VCC in the logic design, respectively. Resource demand is configured into the i-resource, which includes the type of the resource (e.g., computing, network, and storage), capacity, cost, and system requirements. The descriptors of services and applications are then configured into the i-resource as well.

An i-resource that is created for a VCC is configured with the following information: the aggregated communication resource requirement on the VCC, the VCSs in the VCC and their requirements on QOS and security, and the names of the two i-resources connected by the VCC.

Two of the i-resources connected by a VCC are configured with the name of the VCC, and with the VCSs in the VCC, and with the mapping among VCSs and services. The mapping of virtual resources and VCCs to i-resources may be maintained in a persistent database.

The auto-configuration ordering among virtual resources is then transferred into the configuration ordering among the i-resources and configured into the i-resources. Based on the service auto-configuration information in the logic design, services deployed in an i-resource are tagged with their deployment and configuration ordering.

The auto-configuration process starts with resource configuration, followed by the service deployment. During resource configuration, an i-resource contacts a resource management system to acquire necessary a-resources based on the resource requirements. The i-resource then configures the a-resources with system requirements and runs itself on one or more a-resources. The replication of the i-resource is determined by system requirements. During service auto-configuration, an i-resource deploys the specified services onto a-resources with service requirements regarding QOS and security. The auto-configuration process yields a working distributed e-service.

The i-resources and a-resources comprising an e-service collectively fulfill self-management functionality for an e-service in accordance with step 104.

An a-resource enforces QOS and security policies to deliver secure and predictable services. An a-resource contains a self-adjusting control loop that continuously monitors system behaviors and adjusts policy enforcement actions dynamically. When the required service requirement can no longer be guaranteed, an a-resource reports violation to the i-resource to which it belongs.

An i-resource implements system requirements (such as RAS) and controls the enforcement of service requirements in a-resources it uses.

The reliability of an e-service may be realized via a system-wide measure and an i-resource local measure. The system-wide measure may be used to guarantee that all i-resources comprising an e-service are always running. In the system-wide measure, the i-resource of a virtual resource is monitored by the i-resources of those adjacent virtual resources in the virtual resource graph given in the logic design. The i-resource of a VCC is monitored by the two i-resources connected by the VCC. If an i-resource is non functioning, its monitoring i-resources will cooperatively recreate it at runtime. The i-resource local measure is used to guarantee that it always delivers the required resource capacity. In the i-resource local measure, the i-resource monitors all a-resources it uses. If an a-resource is non functioning, the i-resource dynamically reallocates a-resources and re-deploys services on the a-resources. If an a-resource under performs, the i-resource may migrate services from that a-resource to a newly created a-resource. Availability and scalability are realized through service replication and caching. Based on the prediction on distribution and dynamism of customer requests of an e-service, the i-resource dynamically replicates and caches services on multiple distributed a-resources. When an i-resource receives violation reports from its a-resources, it tries to solve it through resource reallocation, service replication, and policy adjustment to a-resources. All violations that an i-resource can not solve may be reported to the logic design process of an e-service for higher level solutions.

Figure 6:
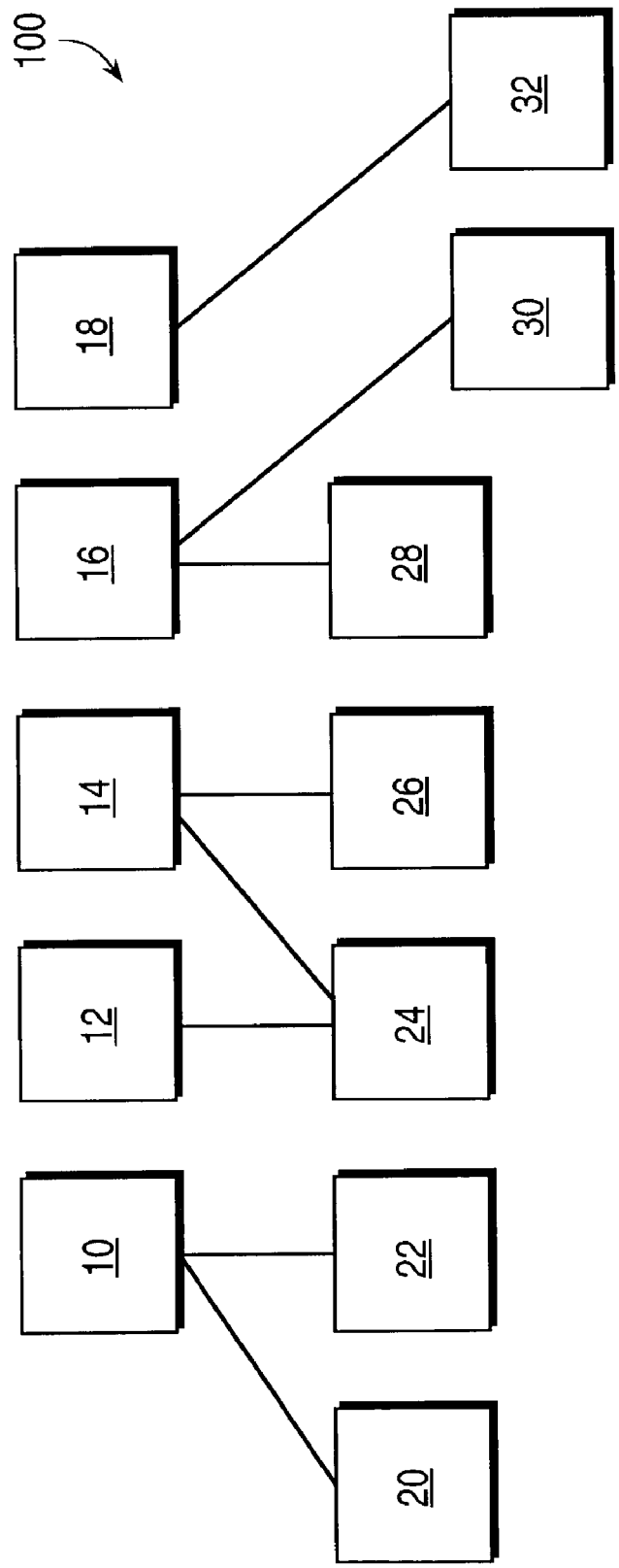
FIG. 6 shows a resource system that provides a resource virtualization mechanism.

FIG. 6 shows a resource system 100 that provides a resource virtualization mechanism. The resource system 100 includes a set of i-resources 10-18 and a set of a-resources 20-32. In this example, the a-resources 20-28 are local active resources and the a-resources 30-32 are remote active resources.

The i-resources 10-18 and the a-resources 20-28 cooperatively interact to provide a presentation of a resource that enables satisfaction of service level agreements (SLAs) to application programs. This presentation may be referred to as resource virtualization. A service level agreement may specify a set of service requirements and system requirements to application programs executing in a system.

The i-resources 10-18 and the a-resources 20-28 provide resource virtualization for any kind of physical resources. Examples of physical resources are numerous and include software resources such as files, data bases, application programs, and information services as well as hardware resources such as storage devices, printers, communication devices, and display devices to name only a few examples. Physical resources may be local resources of a computer system or similar device or may be remote resources accessible via a network connection to one or more other computer systems or similar devices.

The i-resources 10-18 facilitate service requirements by acquiring and managing the a-resources 20-28. Examples of service requirements include quality of service (QOS), security, etc. The SLAs provide a contract between application programs and the i-resources 10-18. As a consequence of the functionality provided by the i-resources 10-18, application programs benefit from a service quality that conforms the SLAs without having to be adapted to the physical resources, mechanisms and policies that are used to implement and enforce the SLAs. The i-resources 10-18 adapt to changes in service demands and resource availability thereby providing a smooth maintenance loop.

For example, any of the i-resources 10-18 may carry out a command to double its capacity due to a change in the load on an application program while the details of the actual acquisition and configuration of the new physical resources to meet the increase in demand are hidden from the application program. As another example, the i-resources 10-18 are capable of handling the failures of physical resources while enabling the application programs to run uninterrupted. The present resource virtualization mechanisms provide transparent resource sharing, resource replication and migration. These resource virtualization mechanisms provide the basis for reliability, availability, and scalability (RAS).

The a-resources 20-32 are software abstractions of physical resources that are directly configurable and controllable by application programs. It may be preferable that the a-resources 20-32 be extensible in that their policies may be modified or replaced through the actions of the i-resources 10-18.

The i-resources 10-18 each include two types of functionalities: (1) the satisfaction of system requirements, for example RAS, through dynamic resource allocation, service migration and service replication; and (2) policy control and service requirement enforcement control to the a-resources 20-32.

The a-resources 20-32 enforce service requirements and a subset of system requirements—for example reliability. The a-resources 20-32 may be fully or partially used by one or more of the i-resources 10-18. The i-resources 10-18 facilitate SLAs by properly configuring and managing the a-resources 20-32.

The i-resources 10-18 provide capacity, quality of service, security, reliability, availability and scalability by automatically allocating the a-resources 20-32 and replicating/migrating services on the a-resources 20-32.

Figure 7:
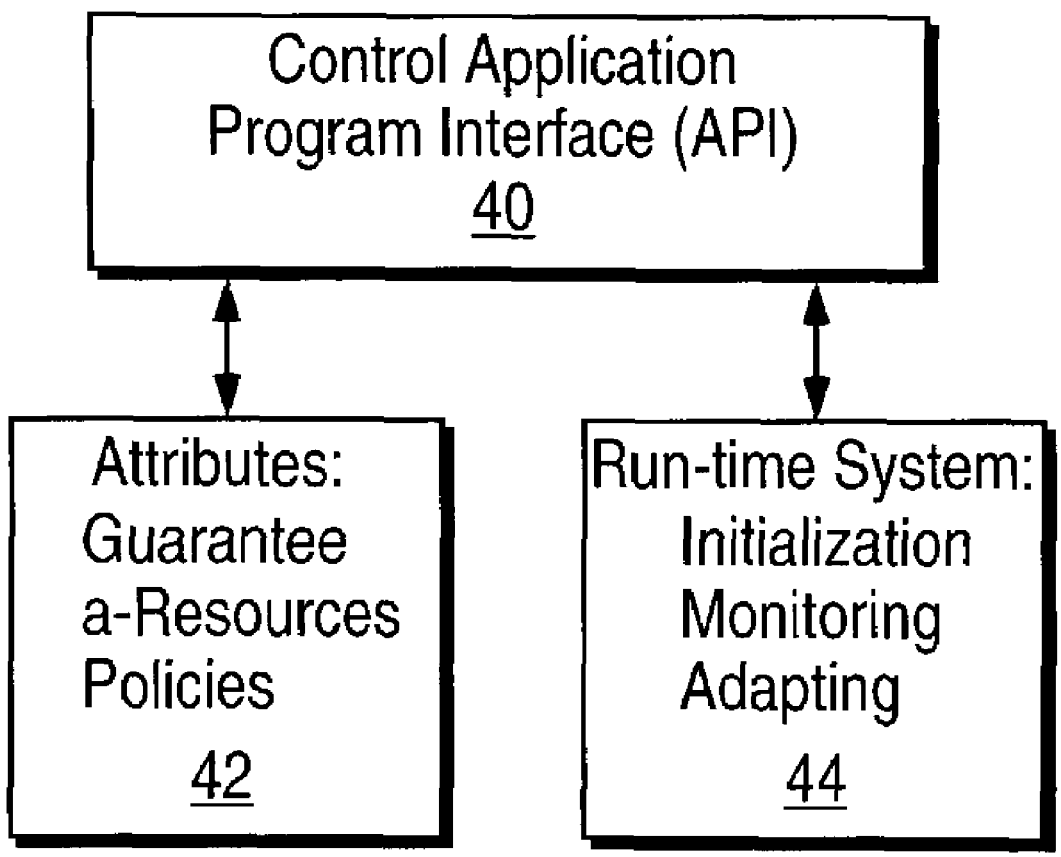
FIG. 7 illustrates logic implemented in an i-resource used in resource virtualization.

FIG. 7 illustrates the logic implemented in each of the i-resources 10-18. Logically, an i-resource includes a set of attributes 42, a runtime system 44, and a control application program interface (API) 40.

The attributes 42 may include a unique name in the namespace of the i-resources 10-18, the type of the i-resource (for example, network (i-net type), storage (i-storage type), or computing power (i-server type)). The attributes 42 may include a guaranteed capacity, performance and protection. This serves as a contract between application programs and the resource runtime.

The attributes 42 may include service descriptors that identify the services/applications to be deployed on the active resources used by the corresponding i-resource. The attributes 42 may include information about how to auto-configure the services/applications.

The attributes 42 may include a reference to an application program. This enables an i-resource to report information back to its application program. The attributes 42 may include procedures for instantiating and initializing the corresponding i-resource. The attributes 42 may include information about the a-resources used by the corresponding i-resource, procedures for configuring the a-resources, and performance information for the a-resources.

The attributes 42 may include information on connections between the corresponding i-resource and other i-resources. These connections may be implemented through virtual channels. Virtual channels may used for supporting distributed applications that span multiple i-resources.

The attributes 42 may include policies for supporting system requirements such as RAS. The policies may include policies on how the load is to be partitioned among the a-resources used by an i-resource—for example policies ranging from complete load replication to load distribution. The policies may include data (or services) replication requirements and policies, load-balancing schemes, if the load is distributed, and policies that enable monitoring of the corresponding i-resource by other i-resources.

The runtime system 44 initializes the i-resource. The runtime system 44 contacts a resource management system to acquire a-resources and configures the acquired a-resources. The runtime system 44 deploys services onto a-resources according to the service auto-configuration attributes. The runtime system 44 may also trigger the initialization of other i-resources. The runtime system 44 monitors the a-resources it uses as well as other i-resources. The i-resources may monitor each other to provide self-reliance. If a monitored i-resource fails, the monitoring i-resource creates another i-resource to replace it.

The runtime system 44 responds to changes in service demand and resource availability. This process includes determination of resource allocation, configuration, service replication and migration. This action may be initiated by the monitoring activity, by system violation events generated by a-resources used by the i-resource, or by prediction.

The control API 40 provides a means for configuring the logic design information into an i-resource, for changing the management policies, and for querying i-resource attributes.

Each of the a-resources 20-32 is a software system that runs on top of a physical resource. Each a-resource 20-32 implements exclusive manageability of the corresponding physical resource, and includes attributes, a runtime system, a service API, and a control API.

The attributes associated with each a-resource 20-32 may include an IP address. In one embodiment, each a-resource 20-32 has at least one IP address. The attributes associated with each a-resource 20-32 include information for measuring the capacity of the system and the current system load. The attributes associated with each a-resource 20-32 include policies to be enforced by the a-resource, resource configuration information, and service configuration information.

The runtime system of each a-resource 20-32 enforces SLAs according to the corresponding requirements and policies. The runtime system of each a-resource 20-32 also includes a monitoring subsystem that tracks the behavior of the corresponding physical resource and updates the metadata system as necessary. The runtime system of each a-resource 20-32 also reports SLA violations to the corresponding i-resource. The runtime system of each a-resource 20-32 may be implemented as several control loops.

The control API of each a-resource 20-32 allows application programs to query the state of the corresponding physical resource, acquire the corresponding physical resource, configure the corresponding physical resource, deploy services on the corresponding physical resource, and download or change policies that control its operation—for example access control policies, security enforcement policies, QOS enforcement policies, etc.

The service API of each a-resource 20-32 allows user identification—for example, using a UID or by providing a unique API or handle for each user. The service API may provide feedback to the user when the requirements specified by the user can no longer be satisfied. The user of the service API is either an i-resource or the system administrator.

The partition of resource virtualization functionalities between an i-resource and an a-resource gives both the i-resources and the a-resources great flexibility and independence to support all kinds of application requirements on a wide variety of physical resources. The coordination between the i-resources and the a-resources provide a general framework for building self-adjusting and managing control loops into any distributed system.

In addition, the i-resources 10-18 provide a protection unit for all corresponding applications/services. A group of i-resources provides a simple and efficient mechanism for distributing a control operation, which may be advantageous for supporting a wide range of distributed applications and e-business systems. A group of i-resources represents an operating environment with guaranteed capacity. This provides a means to map a logic design (part of which describes the resource demand) to the runtime system very smoothly. An i-resource provides information to configure the physical resources, and information to configure and deploy the services and applications. This enables auto-deployment of an e-business system.

The a-resources 20-32 provide support for the virtualization of out-sourced resources. The a-resources provide a general abstract of any kind of physical resource. The a-resources 20-32 implement manageability on top of physical resources and provide a policy enforcement and protection mechanism.

The a-resources 20-32 hide resource specifics from the i-resources 10-18 to maintain the resource independence of high-level virtualization.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A system for automatic management of an e-service comprising:
    auto-deployment management component that creates a runtime e-service by automatically acquiring and configuring a set of resources in response to a logic design for the e-service that specifies a mapping between a set of services for the e-service and the resources;
    runtime management component for detecting a violation of a system requirement for the e-service;
    maintenance management component for determining an optimization for the e-service in response to the violation detected such that the auto-deployment management component conducts resource reallocation and service re-deployment to adjust behavior at runtime.

2. The system of claim 1, wherein the auto-deployment management component generates a workable system in response to the logic design.

3. The system of claim 2, further comprising a logic design management component for generating the logic design in response to a specification for the e-service.

4. The system of claim 1, further comprising a repository of applications and services.

5. The system of claim 1, further comprising a resource management component for managing the resources.

6. The system of claim 1, wherein the e-service is a system that provides electronic services to one or more clients via a network.

7. The system of claim 1, further comprising a virtual operating environment that encapsulates a life cycle of the e-service.

8. The system of claim 7, wherein the virtual operating environment includes a logic design component and a maintenance component.

9. The system of claim 8, wherein the auto-deployment management component re-acquires and re-configures the resources for the runtime e-service in response to a set of requirement update requests from the maintenance component.

10. The system of claim 7, further comprising a self-adjusting system that ensures service level agreements of the e-service.

11. The system of claim 10, wherein the self-adjusting system ensures service level agreements by conducting continuous monitoring of the resources associated with the runtime e-service.

12. The system of claim 10, wherein the self-adjusting system ensures service level agreements by conducting dynamic reallocation of the resources associated with the runtime e-service.

13. The system of claim 10, wherein the self-adjusting system ensures service level agreements by conducting redeployment of a set of services associated with the runtime e-service.

14. The system of claim 10, further comprising a resource management system that provides interfaces that enable the self-adjusting system to query, acquire and release the resources for the runtime e-service.

15. The system of claim 1, further comprising an application/service registration and outsourcing component for registering a set of applications and services which are available for supporting the runtime e-service.

16. The system of claim 1, further comprising a repository having a set of design tools for use in creating the logic design.

17. A method for automatic management of an e-service comprising:

creating a runtime e-service by automatically acquiring and configuring a set of resources in response to a logic design for the e-service that specifies a mapping between a set of services for the e-service and the resources:

detecting a violation of a system requirement for the e-service;

determining an optimization for the e-service in response to the violation detected and in response adjusting runtime behavior by conducting resource reallocation and service re-deployment.

18. The method of claim 17, further comprising generating the logic design in response to a specification for the e-service.

19. The method of claim 17, further comprising ensuring service level agreements by conducting continuous monitoring of the resources associated with the runtime e-service.

20. The method of claim 17, further comprising redesigning the e-service in response to the optimization.

21. The method of claim 17, wherein automatically acquiring and configuring comprises generating a virtual resource graph that provides a mapping between services and resources for the e-service.

22. The method of claim 17, further comprising registering a set of applications and services which are available for supporting the runtime e-service.

* * * * *

UNITED STATES PATENT AND TRADEMARK OFFICE
CERTIFICATE OF CORRECTION

PATENT NO. : 7,509,418 B2  Page 1 of 1
APPLICATION NO. : 10/179642
DATED : March 24, 2009
INVENTOR(S) : Yong Yan et al.

It is certified that error appears in the above-identified patent and that said Letters Patent is hereby corrected as shown below:

In column 10, line 10, in Claim 1, delete "e-service" and insert -- e-service, --, therefor.

In column 11, line 8, in Claim 17, delete "e-service" and insert -- e-service, --, therefor, In column 11, line 14, in Claim 17, delete "resources:" and insert -- resources; --, therefor.

Signed and Sealed this

Twenty-fifth Day of August, 2009

David J. Kappos
*Director of the United States Patent and Trademark Office*